INVENTOR.
ROBERT W. ELLMS.
BY
Oberlin & Limbach
ATTORNEYS.

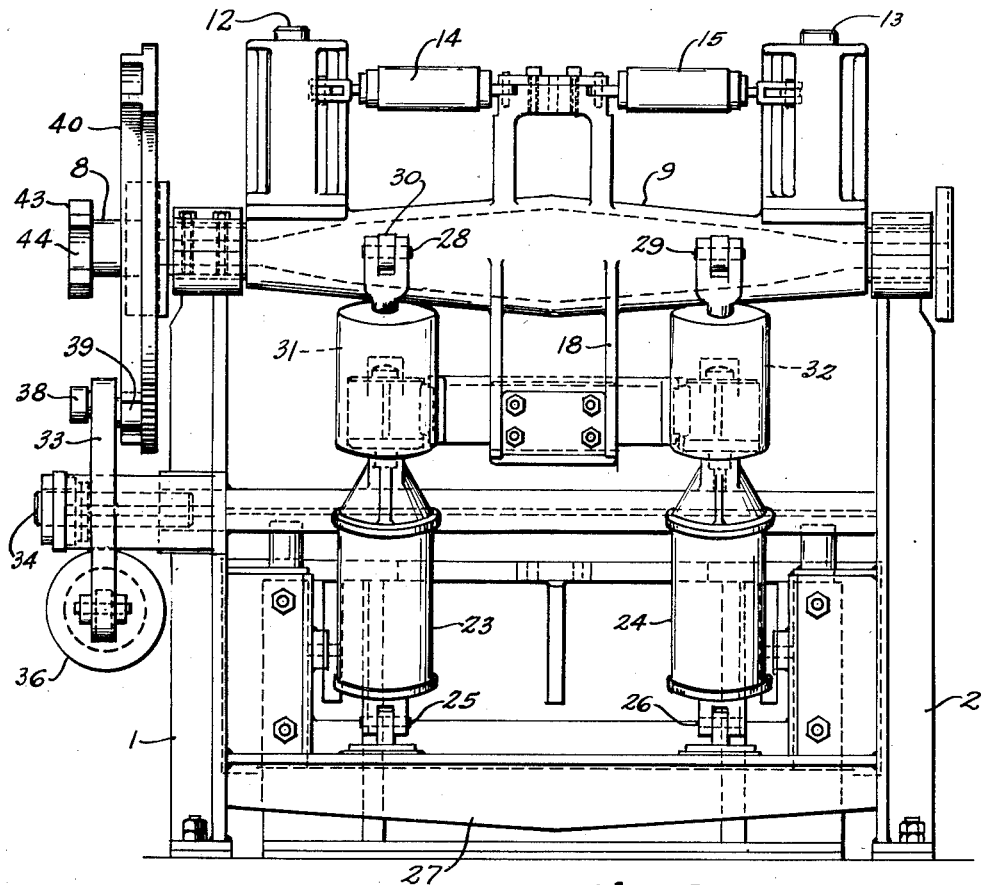
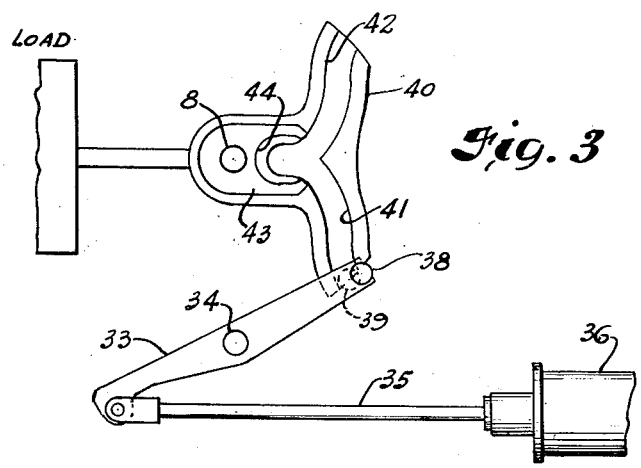
Fig. 2
Fig. 3
INVENTOR.
ROBERT W. ELLMS
BY
Oberlin + Limbach
ATTORNEYS Jan. 1, 1957  R. W. ELLMS  2,775,800
MECHANICAL MOVEMENT AND ROCK-OVER DEVICE UTILIZING THE SAME
Filed Sept. 1, 1955  4 Sheets-Sheet 4

INVENTOR.
ROBERT W. ELLMS
BY
Oberlin + Limbach
ATTORNEYS.

United States Patent Office 2,775,800
Patented Jan. 1, 1957

2,775,800

MECHANICAL MOVEMENT AND ROCK-OVER DEVICE UTILIZING THE SAME

Robert W. Ellms, Lakewood, Ohio, assignor to The Osborn Manufacturing Company, Cleveland, Ohio, a corporation of Ohio Application September 1, 1955, Serial No. 532,000

10 Claims. (Cl. 22—33)

This invention relates as indicated to a mechanical movement and rock-over device utilizing the same, and more particularly to rock-over mechanism especially adapted for employment in conjunction with mold and core drawing apparatus.

The various operations involved in modern foundry practice have been greatly accelerated in recent years, particularly with the successful introduction of turntable molding machines of the type disclosed in application Serial No. 272,969, "Core Blower, Molding and Draw Machine," of Leon F. Miller, filed February 23, 1952. The rock-over unit must lift and invert a heavy flask or core box by swinging the same through an arc of 180° to bring it into proper position for performance of the draw. It is important that the complete rock-over cycle be performed in an interval of not more than 15 seconds and preferably not more than 12 seconds. In the case of large and heavy molds and cores, it will readily be appreciated that a very severe strain is inflicted upon the mechanism when initiating and terminating the rocking motion.

It is, moreover, important that the mold or core should not be subjected to severe shock since otherwise it may be damaged and rendered imperfect. Various dash pot devices have been proposed in the past with reasonable success when operating at rather low rates of speed. The problem becomes acute, however, in the case of the short cycle of operation which it is an object of my invention to attain.

A further object of my invention is to provide a mechanical movement adapted to control such oscillation through a 180° arc without the necessity of a latch at the dead center position.

A further object is to provide such control means effective to assist initiation of the rocking movement when the load is to be elevated and to afford a damping or resisting action to subsequent downward movement of the load.

Still another object is to provide such mechanism which will be very rugged in operation, will require a minimum of maintenance, and which is adapted for employment in conjunction with the usual rock-over mechanism.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is a front elevation of the rock-over mechanism of Fig. 1;

Fig. 3 is a detail view illustrating one preferred form of cam track included in such mechanism.

Figure 1:
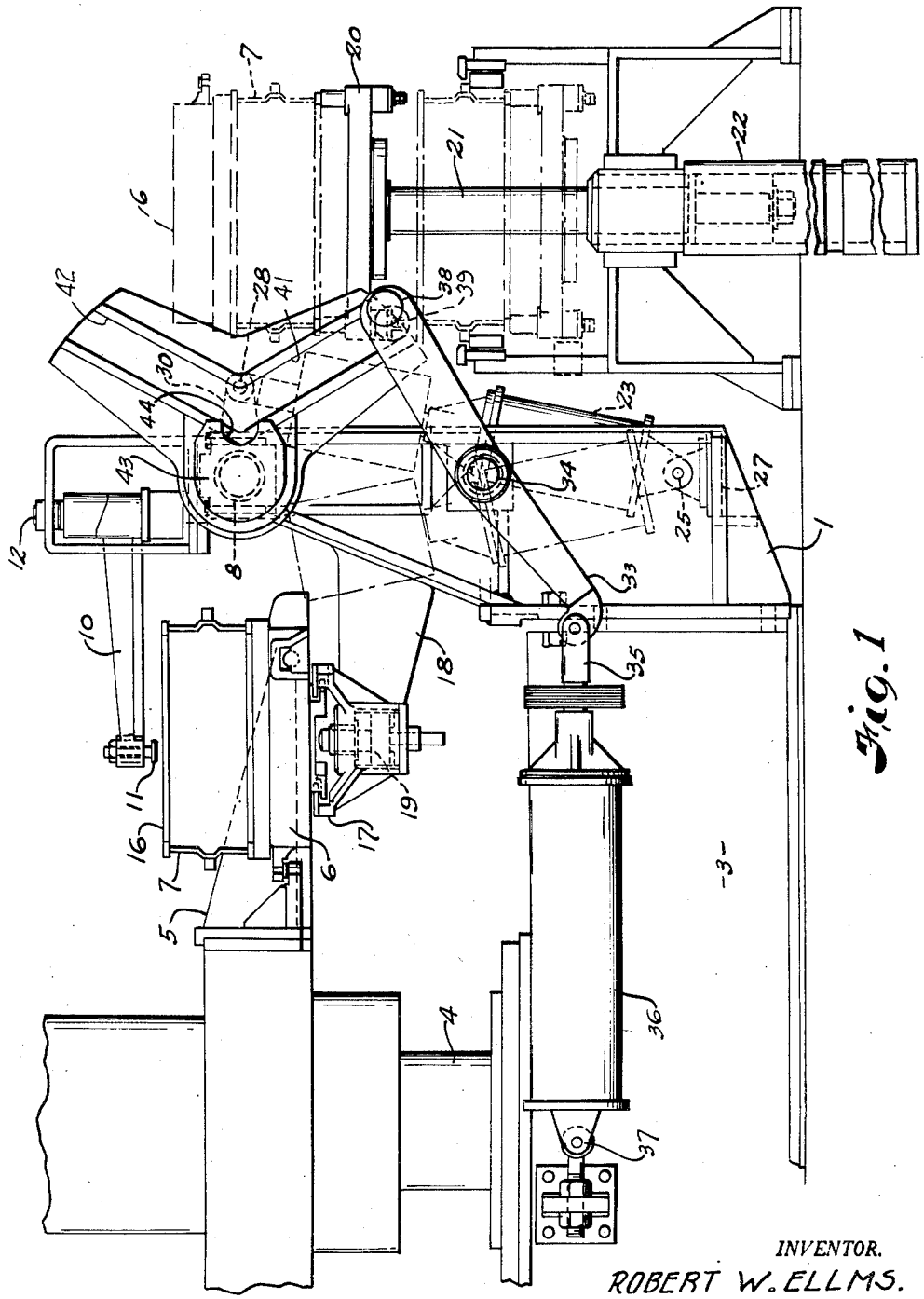
Fig. 1 is a side elevational view of rock-over mechanism embodying my invention mounted on the base of a rotary molding machine which may be of the general type disclosed in the aforesaid Miller application Serial No. 272,969.
Figure 4:
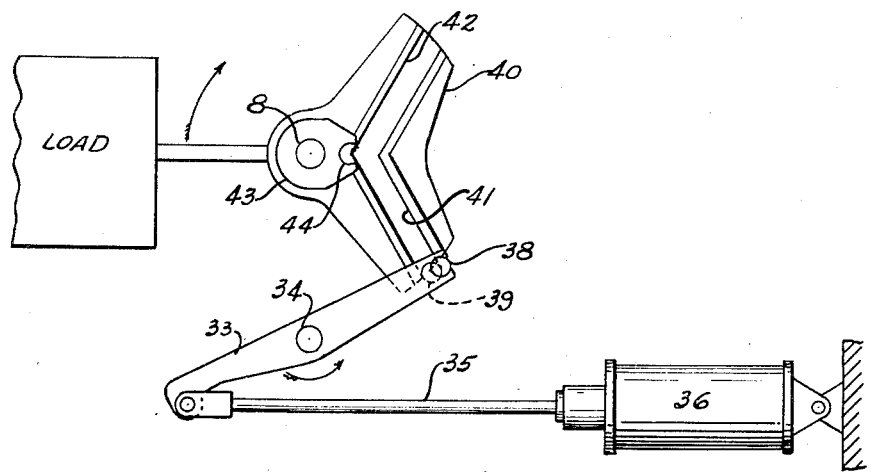
Figs. 4–7 inclusive are a series of semi-diagrammatic views illustrating sequential stages in the operation of the control mechanism.
Figure 5:
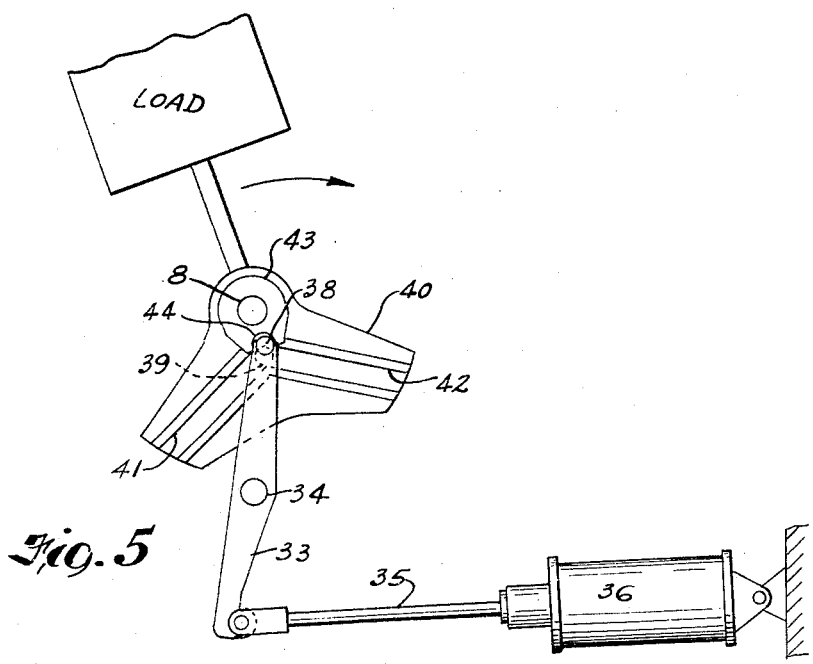

Referring now more particularly to such drawing and especially Figs. 1 and 2 thereof, the embodiment of my invention there illustrated comprises a pair of upstanding side frame members 1 and 2 mounted on the base 3 of a rotary turntable molding machine. Such molding machine may have a central column 4 and a turntable having outwardly projecting arms 5 supporting platens such as 6 having a mold flask 7 thereon. After the flask has been filled and jolt-squeezed or otherwise rammed at other stations, the turntable brings it to the draw station shown in Fig. 1.

A shaft 8 is journalled in the upper end portions of uprights 1 and 2 and carries an upper frame 9 keyed thereto between such uprights. A pair of arms such as 10 having clamping fingers 11 at their ends are adapted to be swung in and out about vertical axes 12 and 13 through action of pneumatic piston-cylinder assemblies 14 and 15. When the arms are swung in over board 16 on flask 7, they are simultaneously cammed downwardly to bear against such board. The underside of platen 6 is provided with cleats adapted to dovetail with cleats 17 on arm 18 rigid with frame 9, and piston-cylinder assembly 19 is operative when energized slightly to lift platen 6 and thereby firmly interengage such dovetail cleats. It will now be apparent that when shaft 8 and its associated frame 9 are rocked about the axis of the shaft, the platen and flask supported thereon will be lifted and swung 180° to the dotted line position shown in Fig. 1 with the flask 7 resting upon draw table 20. The clamping arms such as 10 will then be swung out of the way so that table 20 may be lowered through retraction of piston 21 in cylinder 22, flask 7 descending with the draw table and thereby drawing the mold from the flask secured to platen 6. When the draw has been completed, the mechanism will be rotated in the opposite direction to return the platen to starting position resting on arms 5 of the turntable.

Such oscillation of upper frame 9 and associated parts may be effected through piston-cylinder assemblies 23 and 24 pivotally mounted at 25 and 26 on cross-member 27 welded to uprights 1 and 2, the upper rod ends of such assemblies being pivotally connected at 28 and 29 to short lever arms such as 30. The rods may desirably be enclosed within bellows guards such as 31 and 32 to keep them clean of sand. The mechanism above described is of a type generally known in the art and does not per se comprise my new invention.

In combination with rock-over mechanism such as that described above, I provide special control means operative to ensure smooth but rapid oscillation through the 180° arc. Such control means may comprise a lever 33 pivotally mounted on stub shaft 34 on upright 1, the lower end of such lever being pivotally connected to rod 35 of piston-cylinder assembly 36 pivotally mounted at 37 on main base 3 of the molding machine. The upper end of the lever is provided with two cam rollers 38 and 39, one on each side of the lever. The axis of roller 38 is further spaced from the pivotal axis 34 of lever 33 than is the axis of roller 39. The cam member 40 is keyed to shaft 8 and is provided with a cam track comprising two angularly related portions 41 and 42 defining an apex directed toward the axis of shaft 8. As shown in Fig. 3 of the drawing, these two portions of the cam track may be curved to ensure perfectly uniform torque during operation of the mechanism but it will ordinarily be satisfactory for the cam track portions to be straight as shown in Figs. 4–7 inclusive. The two cam track portions 41 and 42 may be arranged at an angle of 120° to each other.

A cross-over cam 43 is also keyed to shaft 8 and provided with a recess 44 in its outer periphery directed toward the apex of the angle defined by cam track portions 41 and 42, such recess being adapted to receive cam roller 38 when roller 39 has traveled along the cam track to such apex.

The operation of my new rock-over mechanism may now readily be understood. The piston-cylinder assemblies 23 and 24 are energized to rock member 9 to swing the load such as a mold flask or the like through an arc of 180° from the solid line position in Fig. 1 to the dotted line position in Fig. 1. During the first 90° of arcuate movement, considerable power is required to raise the load but when the load has passed center, its own weight and momentum are more than adequate to move it through the remaining 90° and the aforesaid piston-cylinder assemblies will be regulated to resist and control such downward movement. The control mechanism of my invention is adapted to assist such principal operating means in thus controlling the movement of the load and may indeed be substituted therefor if made sufficiently large and powerful. Referring especially to Figs. 4–7 inclusive of the drawing, it will be noted that the axis of pivot 34 is directly beneath the axis of shaft 8 and roller 38 is at a greater distance from axis 34 than is roller 39. The distance between pivot 34 and roller 38 must also, of course, be less than the distance between the fixed axes 34 and 8. Semi-diagrammatic Fig. 4 corresponds to the solid line position of Fig. 1, or starting position. When the piston-cylinder assemblies are energized, shaft 8 is rotated to elevate the load, it being noted (Fig. 5) that the axes of rollers 38 and 39 pass the line between the axes of shaft 8 and pivot 34 before the load has been swung upwardly 90° directly above such latter axes. Roller 38 is of somewhat smaller diameter than semi-circular recess 44 and first engages the far side of such recess and then the near side where the force exerted by such roller against the shoulder of the recess supplies the needed rock-over torque to carry the load past center. Roller 39 now continues along cam track portion 42, exerting an increasingly effective braking action on shaft 8 and the load as the leverage increases, the final pull exerted on lever 33 by the load being substantially longitudinally of the lever. The return movement is the exact opposite of that above described although, of course, a large part of the load (in the form of the sand mold) will have been deposited on the draw table so that the return movement may be made even more rapidly and smoothly.

It will be seen from the foregoing that I have provided a novel cam mechanism and mechanical movement whereby a load may be swung through an upward arc at a high speed and yet under adequate control and with a minimum of strain and jar at the ends of such arc. This mechanism has proven particularly useful in rock-over draw machines utilized in conjunction with high speed foundry molding machines.

Figure 6:
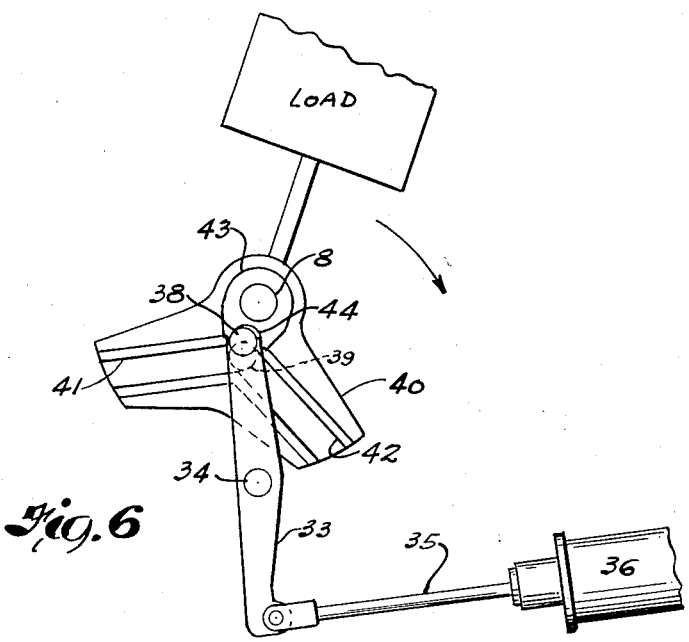
Figure 7:
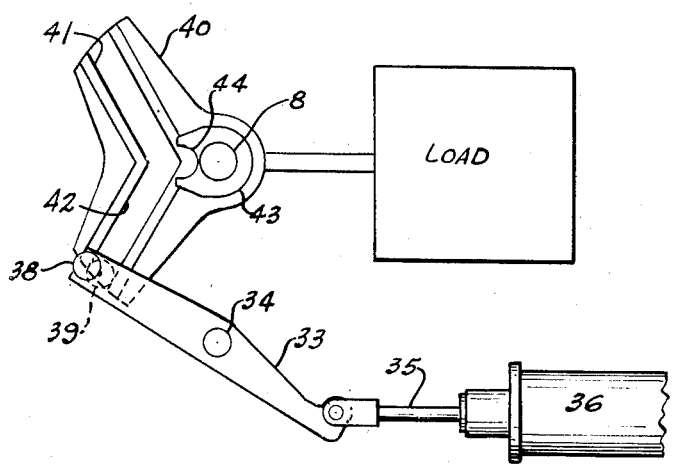

The laying out of a cam track such as that employed herein is well understood in the mechanical motion art, and reference may be had to "Half revolution Geneva mechanism," by Haim Murro, appearing at page 193 in Machinery, June 1953. I generally prefer that such cam track form an obtuse angle with the apex of the V being spaced from but directed toward axis 8 diametrically opposite to the load held by the clamping means and therefore on the same side of such axis as the pivotal connections 28 and 29 of piston-cylinder assemblies 23 and 24. Lever 33 is mounted for oscillation about a fixed horizontal pivotal axis 34 directly beneath and parallel to axis 8, such lever extending less than the distance between such axes. The second cam member 43 is in effect unitary with the rest of the mechanism turning with pivot 8 and the recess 44 is wider than follower 38 to permit the latter to shift from one side of the recess to the other as the load goes past center, it being recalled that follower 38 is spaced further from axis 34 than is cam track follower 39. As shown in Fig. 6, roller 38 by engaging the side shoulder of recess 44 ensures entry of roller 39 into the other half 42 of the cam track. In the Fig. 3 modification each half of the cam track is curved inwardly in its outer end portion and curved oppositely in its intermediate portion approaching the juncture of such halves to afford smooth action and more uniform torque in use.

The two piston-cylinder assemblies 23 and 24 serve to lift the load through 90 degrees and then to hold back on the load while the latter is lowered 90 degrees but (except for momentum) they cannot be relied upon to carry the load past dead center when it is directly over pivot 8. When the load is thus on dead center, however, roller 38 is enabled to carry it past since piston 35 in cylinder 36 has as yet made only half its stroke. Roller 38 engaged in recess or notch 44 in cam 43 has an effective torque arm extending from the point of contact of such roller with the side of the recess to the axis 8. Entrance of roller 38 into such recess moreover serves to ensure that roller 39 will enter the other half of the cam track at this time.

Other modes of applying the principle of the invention may be employed, change being made as regards the details described, provided the features stated in any of the following claims or the equivalent of such be employed.

I therefore particularly point out and distinctly claim as my invention:

1. In a rock-over mold drawing machine for inverting foundry mold flasks for drawing of the pattern therefrom having a frame pivoted for rocking movement about a horizontal axis, a pneumatic piston-cylinder assembly pivotally connected to said frame eccentrically thereof and also to a fixed base operative to rock said frame through an arc of 180 degrees, and flask clamping means on said frame substantially diametrically opposite to the point of pivotal attachment of said assembly and frame; control means for regulating such rocking movement comprising a cam member unitary with said frame for rocking movement therewith, an obtuse V-shaped cam track in said member lying in a transverse plane normal to such horizontal axis, the point of such V being spaced from but directed toward such axis diametrically opposite to the load to be held by said clamping means and therefore on the same side of such axis as such point of pivotal connection of said piston-cylinder assembly to said frame, a lever mounted for oscillation about a fixed horizontal pivotal axis directly beneath and parallel to the aforesaid axis, said lever extending less than the distance between said axes, a cam follower on said lever adapted to travel in said cam track, a piston-cylinder assembly pivotally connected to said lever and a fixed base operative to rock said lever to cause said follower to travel along said cam track and thereby rock said member to assist in elevating such load, a second cam member unitary with said frame adjacent said first cam member and pivotal axis of said frame, said second cam member having a semi-circular recess therein adjoining the apex of said V-shaped cam track and directed theretoward but laterally offset therefrom, and a second cam follower on said lever adjacent said first cam follower but further spaced from the pivotal axis of said lever than said first cam follower, said second cam follower being adapted to enter said recess when said first cam follower reaches the apex of said cam track to ensure entry of said first cam follower into the other half of said cam track as such load is rocked past center, whereupon descent of such load may be restrained.

2. The mechanism of claim 1, wherein said cam followers are anti-friction rollers.

3. The mechanism of claim 1, wherein each half of said cam track is curved inwardly in its outer end portion and curved oppositely in its intermediate portion approaching the juncture of such halves to afford smooth action and more uniform torque in use.

4. In oscillatory mechanism operative to swing a load upwardly about a horizontal axis and then downwardly when past center; control means for regulating such swinging movement comprising a cam member mounted for swinging movement with said mechanism and load, said member having an obtuse generally V-shaped cam track therein lying in a transverse plane normal to such axis, the point of such V being slightly spaced from but directed toward such axis diametrically opposite to such load, a lever mounted for oscillation about a fixed horizontal axis directly beneath and parallel to the aforesaid axis, said lever extending less than the distance between said axes, a cam follower on said lever adapted to travel in said cam track, a piston-cylinder assembly pivotally connected to said lever and a fixed base operative to rock said lever to cause said follower to travel along said cam track and thereby rock said member to assist in elevating such load, a second cam member mounted for movement with said mechanism and load adjacent said first cam member and said first axis, said second cam member having a recess therein adjoining the point of said V-shaped cam track and directed theretoward but laterally offset therefrom, and a second cam follower on said lever adjacent said first cam follower but further spaced from the pivotal axis of said lever than said first cam follower, said second cam follower being adapted to enter said recess when said first cam follower reaches the apex of said cam track to ensure entry of said first cam follower into the other half of said cam track as such load is rocked past center, whereupon descent of such load may be restrained, said recess being wider than said second cam follower to permit movement from one side to the other in said recess while such load is swinging past center.

5. The mechanism of claim 4, wherein said cam followers are anti-friction rollers.

6. The mechanism of claim 4, wherein each half of said cam track is curved inwardly in its outer end portion and curved oppositely in its intermediate portion approaching the juncture of such halves to afford smooth action and more uniform torque in use.

7. In oscillating mechanism adapted to swing about a fixed axis; a cam member mounted for swinging movement with said mechanism, said member having an obtuse generally V-shaped cam track therein lying in a transverse plane normal to such axis, the apex of such V being slightly spaced from but directed toward such axis, a lever mounted for oscillation about a fixed axis parallel to the aforesaid axis, said lever extending less than the distance between said axes, a cam follower on said lever adapted to travel in said cam track, power means operative to rock said lever to cause said follower to travel along said cam track and thereby rock said member, a second cam member mounted for movement with said mechanism adjacent said first cam member and said first axis, said second cam member having a recess therein adjoining the apex of said V-shaped cam track and directed theretoward but laterally offset therefrom, and a second cam follower on said lever adjacent said first cam follower but further spaced from the pivotal axis of said lever than said first cam follower, said second cam follower being adapted to enter said recess when said first cam follower reaches the apex of said cam track to ensure entry of said first cam follower into the other half of said cam track as such mechanism is swung past center.

8. Mechanism in accordance with claim 7, wherein said recess is wider than said second cam follower to permit movement from one side to the other of said recess.

9. In oscillating mechanism adapted to swing about a fixed axis; a cam member mounted for swinging movement with said mechanism, said member having a generally V-shaped cam track therein lying in a transverse plane normal to such axis, the apex of such V being slightly spaced from but directed toward such axis, a lever mounted for oscillation about a fixed axis parallel to the aforesaid axis, said lever extending less than the distance between said axis, a cam follower on said lever adapted to travel in said cam track; power means operative to rock said lever to cause said follower to travel along said cam track and thereby rock said member, a second cam member mounted for movement with said mechanism adjacent said first cam member and said first axis, said second cam member having a recess therein adjoining the apex of said V-shaped cam track and directed theretoward but laterally offset therefrom, and a second cam follower on said lever adjacent said first cam follower but further spaced from the pivotal axis of said lever than said first cam follower, said second cam follower being adapted to enter said recess when said first cam follower reaches the apex of said cam track to ensure entry of said first cam follower into the other half of said cam track as such mechanism is swung past center, said recess being wider than said second cam follower to permit movement from one side to the other of said recess.

10. Mechanism in accordance with claim 9, wherein the two portions of said cam track are of a length and disposed at an angle to each other to lie normal to said lever at the respective terminations of the latter's oscillations.

References Cited in the file of this patent
UNITED STATES PATENTS

| | | |
|---|---|---|
| 1,157,403 | Lewis | Oct. 19, 1915 |
| 1,243,030 | Austin et al. | Oct. 16, 1917 |
| 1,456,318 | Lewis | May 22, 1933 |